2,760,941

ELASTOMER FOAM CONTAINING COLLOIDAL SILICA

Ralph K. Iler, Brandywine Hundred, Del., assignor to E. I. du Pont de Nemours and Company, Wilmington, Del., a corporation of Delaware No Drawing. Original application August 1, 1951, Serial No. 239,853. Divided and this application September 9, 1953, Serial No. 379,292

4 Claims. (Cl. 260—2.5)

This invention relates to novel chemical compositions which are solid dispersions containing an alkali-stabilized colloidal silica and a water-insoluble organic polymer having a molecular weight of more than 10,000, and is more particularly directed to such compositions in which the alkali-stabilized colloidal silica is a material having an average ultimate particle diameter of about 0.01 to 0.03 micron.

Water-soluble alkali metal silicates having calculated weight ratios of $SiO_2$:alkali (in which the alkali is calculated as $Na_2O$) up to 4:1 are well known commercial products, and procedures for making colloidal silica solutions from such silicates as, for instance, by acidifying them, are also well known. Unfortunately most of the colloidal silica solutions made in this manner are unstable, precipitating as gels within relatively short times after preparation. Accordingly, it has long been considered impracticable to make and transport colloidal silica solutions in the usual commercial channels.

Recently, however, compositions which may be described as alkali-stabilized colloidal silica solutions have become available. These colloidal solutions, the preparation of which is described, for instance, in Bird United States Patent 2,244,325, Bechtold and Snyder U. S. Patent 2,574,902, and Rule U. S. Patent 2,577,485 are stable against gelling over prolonged periods, so that it is entirely practicable to transport them and use them at times and places considerably removed from their point of preparation. They contain an alkali such as the hydroxide of sodium, potassium, lithium, or ammonium, or an organic amine. The weight ratio of $SiO_2$ to alkali (the alkali being calculated as $Na_2O$) may be from 10:1 up to as high as 500:1, making it obvious that the alkali and silica are combined in a special manner not found in conventional alkali metal silicates, since the latter cannot be prepared in a form soluble and stable in aqueous solution at ratios above about 4:1. The silica in the sols may have an average particle diameter of about .01 to .03 micron.

The availability of silica in the form of stable sols as above described has, according to the present invention, made possible novel and useful improvements in organic polymeric compositions. It has previously been proposed to add fine powders, including finely divided silica, to various organic polymers, but the silica powders heretofore tried have suffered from numerous disadvantages, often attributable to the size and character of the silica added and its method of incorporation into the polymers. For instance, it is well known that finely divided powders, such as carbon blacks, impart valuable properties to rubber and rubbery materials. More recently it has been proposed to use finely divided silica for this purpose, and in U. S. Patent 2,399,687, for instance, the preparation of silica in a finely divided form said to be particularly adapted for use as a filler and reinforcing agent in rubber has been described. The methods hitherto suggested for incorporating fine silica into rubber have been similar to those used for incorporating carbon blacks and have required milling the rubber and silica together, as on compounding rolls. By such methods the silica added is dispersed but any hard aggregates of silica are not broken down, and it has been considered that breaking down such hard aggregates on the rubber mill was not possible. Moreover, from a consideration of the physical nature of the silica powders which it has heretofore been proposed to add to elastomers it has not been apparent that such powders could be incorporated in any manner other than milling them into the elastomer.

It has heretofore been proposed to modify plastics by the inclusion of silica in finely divided form. Silica ordinarily cheapens a plastic but does not lend properties of any great value.

Silica in the form of finely ground particles down to a size no smaller than about, say, 10 or 15 microns acts in a plastic as an inert filler. Tensile strength is reduced because the bond between the plastic and the silica is weaker than the cohesive forces of the plastic itself and the filler therefore weakens the finished product. Theoretically, silica gel in finely divided form should present a large surface to a plastic and it might be expected that the tensile strength would be greatly increased because of the large surface forces afforded by the gel structure. The silica gel does not effectively present the surface because the plastic will not penetrate the micropores. The gel, moreover, is not easily broken down into fine particles to take advantage of its structure. The gel cannot be completely broken to a small particle size within the colloidal range, but breaks down into angular, irregularly shaped particles many of which are relatively large.

It has recently been proposed to include very finely divided silica in plastics by transferring the silica from a compatible organic carrier. This method of incorporation involves the disadvantage of using a foreign solvent or carrier, and the use of these products is not attended by maximum advantage. The particles act as though they were in solution in the polymer and tend to give brittle products. The particles, moreover, are not dense.

Now according to the present invention it has been found that by introducing silica, as an alkali-stabilized sol of ultimate particles .01 to .03 micron in diameter, into organic polymers having a molecular weight of more than 10,000, there are provided novel and highly useful compositions comprising solid dispersions containing the silica in a matrix of the polymer. In preferred aspects of the invention, the sol used is prepared by a process including the step of passing an alkali silicate solution through an acid-regenerated ion-exchange resin, and the silica particles in the sol are dense and substantially spherical and discrete.

THE SILICA SOL USED

The alkali-stabilized colloidal silica used in a composition of this invention is characterized by containing silica in the form of particles of colloidal dimensions. Although the colloidal range includes particles having an average diameter not exceeding about 0.1 micron nor less than about 0.001 micron, it is preferred in this invention to use colloidal silica having an ultimate particle size in the range from 0.01 to 0.03 micron, that is, 10 to 30 millimicrons. By "ultimate particle size" is meant the average diameter of particle present as measured with an electron microscope when the solution is diluted to about 0.1% $SiO_2$ or less with water and dried in a very thin layer deposit.

Particles smaller than about 10 millimicrons, while effective in regard to their reinforcing action in organic polymers, are not as dispersible as particles larger than 10 millimicrons, when used in the form of an aqueous sol, because such sols show a strong tendency to gel and the ultimate particles aggregate very readily. It would be possible to use sols in which the average particle size is smaller than 10 millimicrons if the silica concentration was kept very low, but this introduces the difficulty that when the dilute sol is mixed with the organic polymer system, the whole mixture is diluted to an undesirable extent. For greatest utility, the silica concentration in the sol to be used should be as high as possible, and it is generally found that more concentrated sols can be prepared in a stable state only when the particles are larger than about 10 millimicrons, in fact preferably larger than about 15 millimicrons.

On the other hand, it is preferred that the average particle size in the sol be less than 30 millimicrons in diameter. Maximum reinforcing effects and other benefits derived from admixture of colloidal silica with organic polymers are obtained when the particles are as small as possible. It is also advantageous to have a sol in which the ultimate particles are individual, discrete, spherical units. Since, in the sol, the individual silica particles in the size range of 10 to 30 millimicrons are not aggregated to form clusters, the reinforcing effect, when the sol is mixed with a dispersion of an organic polymer and the mixture is coagulated, is greater than it would be if the sol particles were aggregated.

The silica particles are not present as anhydrous silicon dioxide, but rather, are in a hydrated form associated with various proportions of water. Thus, partially dehydrated silicic acid would come within the term "silica" as herein used. The silica particles are amorphous, as indicated by their X-ray diffraction patterns.

The silica sols are characterized by having hydroxyl ions and the corresponding cations of the alkali so disposed with relation to the silica particles as to prevent condensation between the particles by oxolation in aqueous solution at a concentration not exceeding about 45% $SiO_2$ by weight. As freshly prepared, the silicic acid in a silica solution may exist as low molecular weight polymers of the theoretical $Si(OH)_4$; however, a condensation reaction known as "oxolation" rapidly occurs whereby water splits out between hydroxyl groups attached to silicon atoms, an Si-O-Si linkage is formed, and a polymer is produced. This process may continue indefinitely and in such a manner that the silicic acid solution rapidly sets up to a gel, the oxolation occurring between externally disposed hydroxyls, i. e., hydroxyls not already inactivated by being inwardly located within a siloxane ring or micelle. It has been found, however, that such polymerization is retarded by the presence of a small amount of alkali such as sodium hydroxide. In the sense that the ions from the alkali are responsible for retardation of the gelling rate of silicic acid solution they may be said to act as "blocking groups."

It will be obvious that the alkali and silica in the colloidal silica solution used in the present invention are associated in a manner radically different from that present in the conventional alkali silicates of the prior art. A proportion of alkali as small as here present would be completely inadequate to render soluble a conventional silicate glass or to peptize it to form a stable colloidal solution.

The colloidal silica solutions used in making the compositions of the present invention are characterized by containing silica in the form of discrete ultimate particles, and the alkali present is not uniformly distributed throughout the particles, but rather, is substantially all outside of the particles, except perhaps for occluded traces. Being external, the cations of the alkali can be removed by such methods as dialysis or ion-exchange using an acid-regenerated cation exchange resin, without affecting the structure of the silica particles. The resultant alkali-free silica sols are unstable toward gelation, but they may be restabilized by adding back a small proportion of an alkali such as sodium hydroxide. Hence, the colloidal silica solutions used according to this invention may properly be referred to as "alkali-stabilized." This stabilization may be accomplished by processes described in the Bird Patent 2,244,325. In order to produce stable solutions with a minimum of alkali stabilizing agent, the polymerization of the silicic acid may be carried to a relatively high molecular weight so as to produce large molecules or discrete colloidal particles which then retain only a small percentage of the reactive hydroxyl groups originally present, and which thus require only a small amount of alkali as a stabilizer. On the other hand the polymerization must not be allowed to proceed in such a way as to form a gel through the aggregation of the original colloidal particles. Such a gelation would occur, for instance, if insufficient alkali were present.

A practical method for producing stabilized aqueous colloidal silica solutions consists in passing an alkali silicate solution through an acid-regenerated ion-exchange resin as described in the above-mentioned Bird patent whereby alkali ions are removed from the silicate and replaced with hydrogen ions. The alkali ions may be completely removed and then alkali hydroxide may be added to furnish the necessary ions required for stabilization, or a portion of the original alkali ions in the silicate may be allowed to remain in the solution as stabilizing ions. In either case, upon subsequent evaporation of the water to concentrate the sol, particularly at temperatures in the neighborhood of the boiling point at atmospheric pressure, growth of the silica particles occurs, and this may be continued until the particle size is at least 10 millimicrons.

The alkali-stabilized colloidal silica solutions incorporated into the organic polymer compositions of this invention are still further characterized by having, in dilute aqueous solution, an extinction coefficient of less than 0.25 for light having a wavelength of 400 millimicrons. A discussion of the method for determining the extinction coefficient is given below under "Characterization techniques."

A particular stabilized aqueous colloidal silica solution which may be used in a composition of this invention is described in the Bird patent at page 2, column 1, lines 12 to 68. As stated in the Bird patent the weight ratio of $SiO_2$ to $Na_2O$ may be as high as from 75 to 100:1 and as low as 10:1. In the present invention ratios above 60:1 give superior results and are preferred. The higher the ratio, of course, the lower will be the proportion of cations from the alkali.

Methods other than the one above described for producing stabilized colloidal silica solutions from alkali silicates by ion-exchange methods may be employed. The use of cation-exchangers in various relations is generally well understood and is described, for instance, in the above-mentioned Bird Patent 2,244,325 and in the Hurd Patent 2,431,481. The Voorhees Patent 2,457,971 also describes cation-exchangers and also shows a method for the preparation of silica sols of the type herein used. The literature is also full of references to cation-exchangers and to their use.

Any insoluble cation-exchanger may be used, the resins of sulfonated carbonaceous exchangers or of sulfonated or sulfited insoluble phenol-formaldehyde resins or acid-treated humic material, or other similar exchangers being typical. Sulfonated coal, lignin, peat, or other insoluble sulfonated humic organic material may be used. Even more preferable are the insoluble resins made from phenols and an aldehyde, particularly formaldehyde. Such resins include those made from phenol itself, diphenylol sulfone, catechol, or naturally occurring phenols, as found, for example, in quebracho, which are modified by the introduction of sulfonic groups either on the ring or on methylene groups. Cation-exchangers which are stable in their hydrogen forms are available commercially under such trade names as "Amberlite," "Zeokarb," "Nalcite," and "Ionac." "Amberlite" is a modified phenol-formaldehyde-sulfonic acid-type resin, "Zeokarb" is a sulfonated coal of the carbonaceous zeolite type, "Nalcite" is a nuclear sulfonated polymer of styrene containing divinyl benzene, and "Ionac" is a phenol-formaldehyde sulfonate—see Ion-Exchange Theory and Application by F. C. Nachod, Academic Press, Inc., New York, N. Y., 1949, at page 385 et seq.

If it is desired to replace, say, sodium ions with hydrogen ions, the exchanger should be initially in the acid form, whereas, if it is desired to replace the sodium ions with ammonium ions the resin should be converted to the ammonium form as shown in Voorhees 2,457,971. It will be understood that to regenerate a spent exchanger to the acid form, even moderately weak acids will often be sufficient.

The exchanger is generally prepared in a granular form which is readily leached free of soluble acids or salts. If the exchanger is exhausted by use it may readily be converted to the acid form by washing with a solution of an acid such as hydrochloric, sulfuric, sulfamic, or a carboxylic acid such as formic, or the like. The exchanger may be treated instead with an ammonium compound such as ammonium hydroxide or ammonium chloride.

One of the preferred cation-exchange resins for use according to the present invention is an aromatic hydrocarbon polymer containing nuclear sulfonic acid groups which is designated "Dowex 50" and of the general type described in D'Alelio 2,366,007 and which is fully described as to its characteristics, properties, and general mode of use in the Journal of the American Chemical Society for November 1947, volume 69, No. 11 beginning at page 2830.

The disclosure in the Bird patent describes the preparation of an effluent from the ion-exchanger having a silica content of about 3 to 3.5% which may be evaporated, preferably in a vacuum evaporator to about one-half its original bulk thereby raising its silica content to about 6 to 6.5%, the resulting sol being relatively stable. A silica sol having a 15% silica content is mentioned. Even at these concentrations the solutions are too dilute to be shipped, stored, and handled economically. It would therefore be preferable to evaporate them to an $SiO_2$ content of from 18 to 30%. This may be done in a number of ways and the product obtained will have somewhat different characteristics depending upon the method of concentration.

For instance, particularly stable, useful sols may be prepared by recently discovered concentration techniques involving particle build-up or growth, as described in the above-mentioned Bechtold and Snyder patent. In this case the concentration may be carried out at elevated temperature—that is, above about 60° C. This may be done in the batchwise manner at constant volume, by adding a suitable volume of ffluent from the ion-exchanger to the evaporator and adding additional fresh effluent at the same rate that water is evaporated off so that the volume in the evaporator remains substantially constant. Preferably, the process will be continued until at least five times as much fresh effluent has been added as was originally present. The evaporation may be carried out at atmospheric pressure or even superatmospheric pressure to give a product having maximum stability and containing as high as 30 to 35% $SiO_2$ in the form of dense, discrete particles. The process may readily be controlled so that the molecular weight of the silica is greater than 0.5 million as determined by light scattering techniques described hereinafter and the average particle size may be below 30 millimicrons as determined from electron micrographs. The silica:alkali ratio is in the range of from 60:1 to 130:1.

An alterative method of evaporation, which gives a product of higher molecular weight but still of colloidal dimensions, may be obtained by carrying out the evaporation at constant volume but in a continuous manner. Thus, from a constant volume in the evaporator concentrated product is continuously withdrawn and fresh effluent is added at a rate sufficient to maintain constant volume in the evaporator and to make up the decrease effected by evaporation and product withdrawal. The product thus obtained contains particles of substantially uniform size corresponding to a molecular weight lying in the range of about from 0.6 to 100.0 million, but, of course, only such products having a particle diameter less than 30 millimicrons are employed in this invention.

The Bechtold and Snyder sols are characterized in general by being stable, aqueous silica sols, by having a silica:alkali mole ratio of from 60:1 to 130:1 (or equivalently, a weight ratio within this range where the alkali is expressed in terms of the weight of $Na_2O$ equivalent to it), and by containing non-agglomerated silica particles having a molecular weight of more than ½ million as determined by light-scattering, the sols having a relative viscosity of from 1.15 to 1.55, at 10% $SiO_2$ and a pH of 10 at 25° C., and containing substantially spherical, non-agglomerated, dense, ultimate particles, substantially all of which have an average diameter in the range of 15 to 130 millimicrons and at least 80% of which have an average diameter of from 0.5 to 1.7 times the arithmetic mean particle diameter. The sols contain an alkali such as the hydroxide of lithium, sodium, potassium, rubidium, cesium, ammonia, or an organic amine. The silica concentration is from 20 to 35% by weight of $SiO_2$. The silica is amorphous, as determined by X-ray diffraction.

Particularly preferred for use in this invention are colloidal silica sols which may be prepared according to the process of Bechtold and Snyder and which have the following characteristics: The aqueous sols are practically clear, having only a slight opalescence. They are stable indefinitely under ordinary conditions of storage and may be stable for many months at 95° C. The sols have an $SiO_2:Na_2O$ mole ratio of from 80:1 to 100:1 and a pH of from 9.5 to 10.5. The sols contain substantially spherical, non-agglomerated, dense, ultimate particles of amorphous silica, substantially all of which have an average diameter in the range of from 15 to 30 millimicrons, and at least 80% of which have an average diameter in the range of 0.5 to 1.7 times the arithmetic mean particle diameter as measured by means of an electron microscope. The spherical, non-agglomerated nature of the particles is also indicated by the low viscosity of the sols which in this preferred case is an absolute viscosity of 2.0 to 4.0 centipoises as measured directly at 25° C. on a sol containing 30% $SiO_2$ at a pH of 9.7, or a relative viscosity of 1.15 to 1.55 as measured at 10% $SiO_2$ concentration and a pH of 10 at 25° C. When the silica sols are adjusted to a pH of 3.5 with dilute hydrochloric acid and evaporated to dryness, the resulting powder possesses a specific surface area as measured by nitrogen adsorption of from 80–300 $M^2/g$. The specific gravity of the sols at 60° F. is from 24.3 to 26.1° Bé. The freezing point of the sols is 32° F. The silica particles have a molecular weight as determined by light scattering of the sol of more than one-half million and less than 90 million. The sols have an extinction coefficient of less than 0.24 for light of a wavelength of 400 millimicrons. The sols have the following chemical analysis:

| | |
|---|---|
| $SiO_2$ | 29 to 31%. |
| Titratable alkalinity as $Na_2O$ | 0.29 to 0.39%. |
| Sulfates as $Na_2SO_4$ | 0.15% Max. |

The silica is amorphous as determined by X-ray diffraction.

A colloidal silica sol which may be prepared according to the process of Bechtold and Snyder and is especially preferred for use in this invention has the following characteristics: The sol is practically clear having only a slight opalescence. It is stable indefinitely under ordinary conditions of storage or even when kept at 95° C. The sol has an $SiO_2:Na_2O$ mole ratio of 92:1 and a pH of 9.6 to 9.8. The sol contains substantially spherical, non-agglomerated dense ultimate particles of silica, substantially all of which have an average diameter of about 15 to 20 millimicrons and at least 80% of which have an average diameter of from 0.5 to 1.7 times the arithmetic mean particle diameter, as measured by means of the electron microscope. The spherical, non-agglomerated nature of the particles is also indicated by the low relative viscosity of the sol which is from 1.2 to 1.4 as measured at 10% $SiO_2$ concentration and a pH of 10 at 25° C. When the sol is adjusted to a pH of 3.5 with dilute HCl and evaporated to dryness, the resulting powder possesses a specific surface area as measured by nitrogen adsorption of about 200 $M^2/g$. The silica particles have a molecular weight as determined by light scattering of the sol of about 3 to 8 million. The density of the sol at 60° F. is 1.2 g./cc. The freezing point of the sol is 32° F. The sol has an extinction coefficient of less than 0.24 for light of a wavelength of 400 millimicrons.

The sol will have the following average analysis:

| | Per cent |
|---|---|
| $SiO_2$ | 30.06 |
| $Na_2O$ titratable | 0.326 |
| $SO_4$ as $Na_2SO_4$ | 0.10 |
| Cl as NaCl | 0.05 |
| Sulfated non-siliceous ash: | |
| Before leaching | 1.20 |
| After leaching | 0.05 |

Sols prepared according to the disclosure of the Bechtold and Snyder patent above-mentioned may contain varying amounts of salts such as sulfates, chlorides, carbonates, bicarbonates, or the like. They also contain a considerable amount of base since they have a silica:alkali oxide mole ratio of from 60:1 to 130:1. The content of ions in the sol prepared from commercial materials by the Bechtold and Snyder process is sufficient to make the specific conductance of the sol about $5 \times 10^{-3}$ mho/cm. at 28° C. and 10% $SiO_2$. This ion content tends to decrease the stability of such sols at very high $SiO_2$ concentrations and to reduce their compatibility with organic materials.

The preparation of improved, stable, highly concentrated, substantially salt-free silica sols, which may be used in compositions of this invention, is disclosed in the Rule U. S. Patent 2,577,485. These sols are stable even when concentrated to upwards of 35% $SiO_2$, by reason of the fact that not only do they contain amorphous silica particles which are dense, non-agglomerated, spherical and above 10 millimicrons in diameter, but that the sols are substantially salt-free and contain only enough alkali metal hydroxide to give a silica:alkali oxide mole ratio of from 130:1 to 500:1.

The sols described in the Rule patent are prepared by processes wherein a quantity of alkali metal hydroxide sufficient to produce the desired silica:alkali ratio is added to a sol containing amorphous silica particles which are dense, non-agglomerated, spherical and have an average diameter of 10 to 130 millimicrons, the sol being substantially free of electrolytes and having a relative viscosity, as measured at 10% $SiO_2$, and pH 10, and 25° C., of 1.15 to 1.55 and a specific conductance, as measured at 10% $SiO_2$ and 28° C., of less than $4 \times 10^{-4}$ mho/cm., the amount of hydroxide added being enough to adjust the silica:alkali oxide mole ratio to from 130:1 to 500:1.

A preferred method for preparing the sols disclosed by Rule is to start with a sol of the type disclosed by Bechtold and Snyder and treat it further with ion-exchangers until it has been made substantially free of electrolytes. Thus, a Bechtold and Snyder sol may be deionized by subjecting it to successive contact with a cation-exchanger such as "Nalcite HCR" in its hydrogen form and an anion-exchanger such as "Amberlite IR 4B" in its hydroxide form. The sol is comparatively unstable after complete purification by this method, particularly at higher concentrations—that is at concentrations above about 30% $SiO_2$. However, as shown in U. S. Patent No. 2,601,352 to Wolter, the sol can be stabilized by adding a nitrogen base such as an organic amine or a quaternary ammonium hydroxide.

According to the method disclosed in the Rule patent, such deionized sols may be stabilized by the addition of enough alkali metal hydroxide to give a silica:alkali oxide mole ratio of from 130:1 to 500:1. The alkali metal hydroxide used may be the hydroxide of lithium, sodium, potassium, rubidium or cesium. The alkali metal hydroxide is preferably added to the silica sol as a solution with agitation. The resulting sol may be concentrated to very high silica concentrations by the direct evaporation of water with vigorous agitation, the silica content being carried to as high as 50% $SiO_2$ or more without gelation. For products of the highest silica content, it is preferable to use a sol containing a minimum of anions and having a silica:alkali ratio of from 150:1 to 300:1 and more particularly about 200:1.

A considerable excess of anion exchanger is ordinarily used in the Rule process and the content of anions other than OH (e. g. chloride and sulfate) drops to an exceedingly low figure and does not total more than about 0.02 to 0.03%. As pointed out above, treatment of the sol with an anion-exchange resin is preceded by treatment with a cation-exchange resin.

It is preferred to carry out the deionization upon relatively concentrated sols—that is, above about 20% $SiO_2$. A sol which has had the cations substantially removed at high silica concentration has some tendency toward gelling, and the treatment of such a sol according to the process of the Rule application preferably is carried out as soon as feasible after the deionization is effected.

Anion-exchangers are generally well-known and the composition of anion-exchangers and their mode of use are fully described in the literature. Suitable materials are mentioned, for instance, in U. S. Patents 2,438,230 and 2,422,054. A description of both cation and anion-exchangers will be found in the May 1945 issue of Chemical Industries in an article entitled "Ion-Exchange" by Sidney Sussman and Albert P. Mindler at pages 789, et seq.

While any of the anion-exchangers described will be found satisfactory, the insoluble resins obtained by the reaction of formaldehyde with an aromatic amine are particularly useful. Such products are described, for instance, in the U. S. Patent 2,151,883 of Adams and Holmes. Reference is made, for instance, to the metaphenylenediamine formaldehyde type of anion-exchanger in the Ryznar Patent 2,438,230 stated above. A guanidine-type anion-exchanger may also be used.

A particularly preferred anion-exchanger is commercially available under the trade name "Amberlite IR-4B." This is characterized as being a modified phenol formaldehyde polyamine condensate containing 14% nitrogen and 39.9% water in the basic form of the resin and having an exchange capacity of 10 milliequivalents per gram of resin. The properties of the resin are described further by Kunin and Meyers in the Journal of the American Chemical Society, vol. 69, p. 2874, 1947.

The stable, highly concentrated, substantially salt-free silica sols may also be prepared by the processes disclosed in Rule U. S. Patent 2,577,484. Such a process comprises preparing a substantially salt-free active low molecular weight silica sol by effecting contact, successively, between a sodium silicate solution and a cation-exchanger in the hydrogen form and an anion-exchanger in the hydroxide form, adding a suitable amount of alkali hydroxide to adjust the $SiO_2:M_2O$ mole ratio of the sol to from 130:1 to 500:1, heating a portion of the adjusted sol to a temperature above 60° C. under atmospheric pressure to form a substantially salt-free heel containing substantially spherical non-aggregated, dense silica particles, by adding to the heel an additional quantity of the original active silica sol while maintaining the pH in the range from 7.5 to 10.7, the temperature above 60° C. and preferably at the boiling point of the sol, whereby water is evaporated, the additional quantity of active silica sol being added at such a rate, relative to the rate of evaporation, that the volume of the combined sols remains substantially constant, the amount of silica added being at least 3 to 15 times as much as that originally present in the heel, and concentrating the sol to upwards of 35% by weight of silica by direct evaporation with agitation, the resulting sol being stable toward gelation.

The aqueous silica sols produced according to either of the above Rule patents are stable, practically clear sols containing amorphous silica in the form of dense, non-agglomerated, spherical particles having an average particle diameter of 10 to 150 millimicrons, in a concentration of from 35% to upward of 50% $SiO_2$ by weight. The sols have a silica:alkali oxide mole ratio of from 130:1 to 500:1, a relative viscosity of from 1.15 to 1.55 as measured at 10% $SiO_2$ and a pH of 10 at 25° C., and a specific conductance, as measured at 10% $SiO_2$, and 28° C., of less than $$\left(\frac{10,000}{R}+30\right)\times 10^{-5} \text{ mho/cm.}$$

where R is the silica:alkali oxide mole ratio.

A sol which may be prepared according to either of the Rule processes and is particularly preferred for use in this invention has the following characteristics: The sol is practically clear, having only a slight opalescence. It is stable indefinitely under ordinary conditions of storage and does not gel after one month of heated storage at 95° C. Electron microscopic examination shows that the sol contains substantially spherical, non-agglomerated, dense, ultimate particles of amorphous silica, substantially all of which have an average diameter of from 0.5 to 1.7 times the arithmetic mean particle diameter which is 15 to 20 millimicrons. The sol has absolute viscosity of about 250 centistokes at 25° C., and when diluted to a concentration of 10% $SiO_2$ and adjusted to a pH of 10, the relative viscosity is 1.2 to 1.4. When such a silica sol is adjusted to pH 3.5 with dilute hydrochloric acid and evaporated to dryness at room temperature under vacuum, the resulting powder has a specific surface area as measured by nitrogen adsorption, of about 200 $M^2/g$. The specific conductance of the sol which contains 40% $SiO_2$ is $2.9\times 10^{-3}$ mho/cm. at 28° C. The pH of the sol is 9.6 to 9.8. The density of the sol is about 1.30 g./cc. The freezing point of the sol is 32° F. The mole ratio of $SiO_2:Na_2O$ in the sol is about 150:1. A typical product has the following analysis:

| | Percent |
|---|---|
| $SiO_2$ | 40.8 |
| Sulfated non-siliceous ash | |
| Before leaching | 0.67 |
| After leaching | 0.08 |
| Cl | 0.001 |
| Na | 0.19 |
| $SO_4$ | less than 0.005 |

It will be noted that the Bechtold-Snyder method is capable of giving silica sols having particle sizes in the range from 15 to 130 millimicrons and the Rule sols may contain particles of 10 to 150 millimicrons in diameter. For the purposes of the present invention only sols having a particle size in the range of 10 to 30 millimicrons are employed. The particle size may be controlled by limiting the amount of build-up permitted to occur in the sols. For instance, the amount of silica added as build-up in the Bechtold-Synder process may be restricted to the minimum, 5:1 build-up ratio.

Methods of characterizing sols in the terms above set forth are given below under "Characterization techniques."

THE ORGANIC POLYMER

The organic polymer with which silica is used according to the present invention may be any organic plastic polymer having a molecular weight greater than 10,000. The term "plastic" is used in its usual and ordinary meaning, as defined in Modern Plastics Encyclopedia, 1950 edition, at page 30: "A plastic is any one of a large and varied group of material which consits of, or contains as an essential ingredient, an organic substance of large molecular weight, and which, while solid in the finished state, at some stage in its manufacture has been or can be formed (cast, calendered, molded, etc.) into various shapes by flow—usually through the application, singly or together, of heat and pressure."

Included as organic polymers is that special class of substances known as "elastomers." An elastomer, as defined at page 30 of the Modern Plastics Encyclopedia just mentioned, is "A material which at room temperature can be stretched repeatedly to at least twice its original length and upon immediate release of the stress, will return with force to its approximate original length."

Not included are such products as the so-called "snythetic waxes," as for example, the ethylene telomers of Hanford and Joyce U. S. Patent 2,440,800, since these materials are generally products of low molecular weight and in any event have a molceular weight well below 10,000.

The silica sols above described can advantageously be employed with phenolic resins such as phenolformaldehyde resins. They may aslo be used in terpene phenolic resins. The resins may be of the Novolak or of the infusible types. The phenolic resins may be A-stage resins, or resols; B-stage resins, or resitols; or resites, or C-stage resins. If the silica sol is added to a resin having a molecular weight below 10,000, however, the resin should be further polymerized until the molecular weight exceeds 10,000. The phenolic resins may be used in accordance with customary practices and may include fillers and modifying agents in addition to the silica.

The silica sols may be included similarly in resorcinol-formaldehyde resins, urea-formaldehyde resins, phenol-resorcinol-formaldehyde resins, and phenol-furfural resins. Similarly, the silica sols may be used in furan resins. The furan resins have been particularly successful in the preparation of cold-setting cements, and the described silicas may be included in such adhesives as fillers. They may, of course, be included in furan resins used as coatings, as impregnants, and as moldings and castings.

Melamine resins may also be modified by the inclusion of the described silica sols. Urea-modified melamines and co-condensation products of melamine-formaldehyde resins and diglycol carbamate may also be used.

The silica products described can also be included in the polyester resins such as the copolymers of diallyl phenyl phosphonate with monomers such as methyl methacrylate, vinyl acetate, diallyl phthalate, diallyl succinate, diallyl oxalate, and unsaturated alkyd resin mixtures. Other polyester resins may also be used.

The described silica sols may also be used to modify alkyd resins. These are prepared, of course, by polymerization of phthalic anhydride, maleic anhydride, or sebacic acid or other high molecular weight polybasic acid, with a polyhydric alcohol such as glycerol, the glycols, pentaerythritol, or sorbitol.

The acrylic resins may also be modified. These include polymeric methyl methacrylate and related polymers such as cyclohexyl methacrylate. The silica products are particularly advantageous in methyl methacrylate polymers because the transparency is not affected adversely when moderate quantities of the silica are used.

The silica products can also be included in vinyl polymers and copolymers. These include such products as polyvinyl chloride, polyvinyl acetate, polyvinyl-chloride acetate, vinyl chloride-vinylidene chloride polymers, and polyvinyl acetals. In compounding the vinyl resins the silica can be used as heretofore described together with the fillers and plasticizers ordinarily employed. The value of the silica is particularly great in coated fabrics prepared using vinyl compounds.

Particularly good results are obtained by the inclusion of the described silica sols in polyethylenes. The product may advantageously be included in either films or cast objects of polyethylene. A polytetrafluoroethylene may similarly be modified.

The described silica sols can be used with advantage in styrene polymers and copolymers. The silica may be used, for instance, in polystyrene, in mixtures of polystyrene and chlorinated diphenyl, in copolymers of butadiene and styrene and in polymers of styrene-isobutylene and copolymers of maleic anhydride and styrene. The silica can be used with advantage in styrene foam and in emulsions or solutions containing polystyrene and from which films are later formed.

The silica sols may similarly be used in nylon (polyamide) resins. The silica serves to add to the already great dimensional stability and thermal stability of nylon. They may be used to modify coumarone-indene and polyterpene resins. They can be used in casein and other protein plastics including casein-formaldehyde plastics.

As has been observed above, the silica products previously described can be used in polymeric organic plastic materials generally and these include rubber and related elastomers. The elastomer may be any rubberlike polymeric material. The term "elastomer" is a general descriptive term for this class of products and may be regarded as an abbreviation for "elastopolymer" or "elastic polymer." (See Advances in Colloid Science, volume 2, 1946, at page XXV.) As here used it includes the high molecular weight natural caoutchouc, as well as synthetic rubbers and rubber-like materials such as neoprene, butyl rubber, and the styrene-butadiene copolymer known as GR–S.

More particularly, some of the elastomers included are butadiene copolymerized in various ratios with styrene, butadiene copolymerized in various ratios with acrylonitrile, polymerized butadiene, polymerized, 2,3-dimethyl butadiene, polymerized 2-chlorobutadiene, 1,3,-isobutylene copolymerized with isoprene, copolymers of butadiene and methylmethacrylate, butadiene copolymerized with methylvinyl ketone, and various other copolymers of butadiene with ethylenic-unsaturated hydrocarbons. It will be noted that the invention is applicable to diene elastic polymers as a class.

The silica sols can be included in such modified rubber products as chlorinated rubber and cyclo rubbers prepared by the action of chlorostannic acid, for instance, on natural or synthetic rubbers. They may also be included in elastomers containing multiple sulfur linkages, such as the "Thiokol" types.

There is a group of organic polymers, having properties somewhat different from those of the polymers just discussed, with which silica may advantageously be employed according to the present invention. This group includes naturally occurring polymers such as water-insoluble starch, natural gum resins such as shellac, copal gum (including Manila gum), rosin, and terpenes. It will be noted that in their lower degrees of polymerization some of these organic polymers are somewhat water-soluble, and it is intended to include in the scope of this invention only those which have a molecular weight in excess of 10,000 and are water-insoluble. The copal gum and shellac dispersions containing silica are particularly useful when they also include a wax, such as carnauba wax or other ester wax, since the combination makes excellent floor waxes having pronounced skid resistance.

Resinous organic polymers which also have valuable properties in floor coatings when dispersed together with silica are given in the following tabulation. If the molecular weight of the polymer is in excess of 10,000 the polymer may be used alone with the silica, but if the molecular weight is less than 10,000 the polymer may be used in combination with another polymer which has a molecular weight above 10,000.

WATER DISPERSIBLE RESINS

| Resin | Specific Gravity[1] | Index of Refraction[1] | Melting Point, °C. | Saponification Number[1] | Acid Number[1] | Chemical Type |
|---|---|---|---|---|---|---|
| "X597"[8] | | | [2,3] 150–165 | | [3] 130–138 | A modified maleic type. |
| "Amberol 750"[4] | 1.29 | | [5] 155–175 | | 105–115 | A fortified ammonia-soluble maleic ester of rosin. |
| "Durez 15546"[6] | 1.17 | 1.542 | [7] 150±3 | | 130±3 | |

WAX-SOLUBLE RESINS

| Resin | Specific Gravity[1] | Index of Refraction[1] | Melting Point, °C. | Saponification Number[1] | Acid Number[1] | Chemical Type |
|---|---|---|---|---|---|---|
| "Lewisol 28"[9,10] | 1.138 | | [11] 143 | | 36 | A maleic alkyd-modified ester of rosin. |
| "Piccolyte S-85"[12] | 0.98–1.0 | | [5] 85 | 0–<4 | 0–<4 | A polyterpene predominantly beta pinene. |
| "Durez 219"[13] | 1.085 | 1.552 | [7] 135 | | 50–60 | A terpene phenolic. |
| "Pentalyn A"[10] | 1.03 | 1.544 | [11] 110 | | 14 | A pentaerythritol ester of rosin. |
| "Pentalyn C"[10] | 1.09 | 1.546 | [11] 135 | | 15 | A modified pentaerythritol ester of rosin. |

[1] Determined by the conventional method at 25° C.
[2] Determined by the mercury method.
[3] Product specifications listed on container.
[4] Characterized in "Amberol 750 in Wax Emulsions," Product Bulletin, form 20R, published by Rohm & Haas Co., June 1950.
[5] Determined by A. S. T. M. method D-127-30.
[6] Characterized as "Durez 15325" ground to 20 mesh, in Technical Data Bulletin of U. S. Industrial Chemical Co., dated August 16, 1950.
[7] Determined by the capillary tube method.
[8] Characterized in "Resinews," Vol. XV, published by U. S. Industrial Chemical Co., copyright 1947.
[9] Viscosity=E, Gardner-Holdt, at 25° C. on 60% solution (by weight) in toluene.
[10] Characterized in "Hercules Synthetic Resins," published by Hercules Powder Co., copyright 1947.
[11] Softening point, determined by Hercules drop method.
[12] Molecular weight averages about 650. Ash less than 0.1%. Characterized in "Piccolyte, the Versatile Resin," published by Pennsylvania Industrial Chem. Corp., copyright 1948.
[13] "Durez Protective Coating Resins in Emulsion-Paste and Liquid Waxes," published by Durez Plastics and Chemicals, Inc.

Still other organic polymers which, when modified with silica according to this invention, make excellent films and effective floor coatings of the slip-resistant wax-like type even without wax present are the following:

"Pliolite" Latex 150. Reference—Bulletin 1501, Chemical Products Division, Goodyear Tire & Rubber Company. Resinous, copolymer hydrocarbon. (Pliolite latices are believed to be styrene butadiene copolymers, the styrene content increasing as the number increases.)

| | |
|---|---|
| Total solids | 30%. |
| Viscosity | 30 cps. |
| pH | 9.5–10.5. |
| Specific gravity | 1.01. |
| Surface tension | 35–40 dynes/cm. |
| Mechancal stability | No coagulation in 10 minutes under high speed agitation. |
| Storage stability | Excellent. |

"Pliolite" Latex 170. Reference—Bulletin 1701, Chemical Products Division, Goodyear Tire & Rubber Company. Resinous, copolymer hydrocarbon.

| | |
|---|---|
| Total solids | 28%. |
| Viscosity | 40 cps. |
| Specific gravity | 1.01. |
| pH | 9.5–10.5. |
| Surface tension | 35–40 dynes/cm. |
| Mechanical stability | No coagulation in 10 minutes under high speed agitation. |
| Storage stability | Excellent. |

"Pliolite" Latex 190 for latex reinforcement.[1]

| | |
|---|---|
| Color | Light amber. |
| Specific gravity | 1.01. |
| Solids | 30±3%. |
| pH | 10.7±0.7. |
| Surface tension | 35±2 dynes/cm. |
| Mechanical stability | Excellent. |

[1] Reference: "Butadiene-Styrene Resinous Copolymers," J. D. D'Ianni, L. D. Hess, W. C. Mast, Goodyear Tire and Rubber Co., Akron, Ohio. Ind. & Eng. Chem., vol. 43, p. 319 et seq., February 1950. P. 323 "Weatherford and Knapp (37) discussed the properties and applications of a latex (Pliolite Latex 190) containing a resinous copolymer of about 10% butadiene and 90% styrene."

"Lustrex" Latices. Reference—Production Information Bulletin #58, Monsanto Chemical Company.

Stable aqueous dispersions of polystyrenes containing negatively charged particles less than 1 micron in diameter. The plasticized latices form soft, flexible, somewhat tacky films on room temperature drying.

"Lustrex" Latices—Tentative Data Sheet—Development Bulletin X–600–3 revised June 1949, Monsanto Chemical Company.

| | X–600 | X–620 | X–630 |
|---|---|---|---|
| Total Solids | 39–41 | 39–41 | 39–41. |
| Specific Gravity at 25° C | 1.03 | 1.04 | 1.05. |
| Viscosity (centipoises at 25° C.) | 10–30 | 5–15 | 10–25. |
| pH | 8–9.5 | 8–9 | 9.5–11. |
| Plasticizer | None | "Santicizer" 160. | "Santicizer" 160. |
| Plasticizer content, percent dry solids | do | 33 | 33. |

"Hycar" Latices. Reference—Service Bulletin 47–H1, B. F. Goodrich Chemical Company, October 1, 1947.

Stable suspensions of spherical particles of butadiene acrylonitrile type American rubber, 0.06 micron in diameter and negatively charged. These suspensions contained a fatty acid soap for stability. OR–25 is resistant to organic solvents when dried.

"Hycar" OR–25

| | |
|---|---|
| pH | 8.5–9. |
| Total solids | 40%. |
| Particle size | 0.06 micron. |
| Specific gravity | 1.002 at 25/4° C. |
| Viscosity | 42 cps. at 25° C. |
| Surface tension | 51 dynes/cm. |
| Color | Buff. |

"Rhoplex"—Rohm & Haas—Resinous Products Division Bulletin.

"Rhoplex" WN–75 is an aqueous dispersion of a non-ionic, acrylic-type polymer. ("Rhoplex" WN–80 and FRN are similar.)

| | |
|---|---|
| Solids (percent) | 40. |
| Colloidal Charge | Neutral. |
| Specific gravity (25° C./25° C.) | 1.08. |
| Viscosity, cp., 12 R. P. M. | 195. |

Stable toward—
Acids as 10% $H_2SO_4$
Bases as $NH_3$
Salts—many
Temp. 60° C., 4 wks., 200° C., 5 min.
Freezing, 1% coagulated
Agitation—Good

MAKING THE NOVEL COMPOSITIONS

The novel compositions of this invention are solid dispersions containing the silica and the organic polymer. The colloidal silica is dispersed in a matrix of the solid polymer. To make them a silica sol can be mixed with an aqueous dispersion of the polymer and the mixture dried or gelled to form a solid product. The choice of method for making the compositions will, of course, depend upon the forms of product desired.

In preparing a product of this invention an aqueous dispersion may first be produced by separately preparing an aqueous dispersion of the organic polymer and mixing it with an alkali-stabilized colloidal silica solution or it may be prepared by dispersing the organic polymer directly in such alkali-stabilized colloidal silica solution. By the former method, for instance, one might simply mix an aqueous dispersion of polyvinyl acetate with an aqueous alkali-stabilized colloidal silica solution, whereas by the latter method one might disperse polyvinyl acetate in the alkali-stabilized colloidal silica solution in a suitable mixer such as a Banbury mixer. It will be understood that dispersion of the organic polymer may be facilitated by first softening it with plasticizers, dissolving it in organic solvents, or melting it prior to dispersion in the aqueous phase. Alternatively, plasticizers may be added to the dispersion after it has been formed.

When the organic polymer is an elastomer, the alkali-stabilized colloidal silica may be added to a latex of the elastomer, that is, to an aqueous dispersion of the elastomer. In this manner very uniform dispersion of the silica throughout the latex is achieved. The latex and the colloid silica may then be coagulated, resulting in the formation of a solid elastomer composition containing the dispersed colloidal silica.

The choice of coagulant will, of course, depend in part upon the particular stabilizing agent originally used to stabilize the elastomer latex. Where the latex is stabilized under alkaline conditions with ammonia, the coagulating agent may be an acidic material such as calcium chloride. The coagulating agent may also act by abstracting the water from the mixture, and thus an organic solvent such as methanol or acetone may be used. In like manner mutual coagulation of the colloidal silica and latex may be accomplished by evaporating off the water or by freezing it, or by electrodepositing the elastomer particles in combination with the silica.

Dispersions of the organic polymer for mixing with the silica sol may be prepared by any of various ways with which the art is familiar. The polymer may be ground in an attrition mill, such as a ball mill or edge-runner mill, together with a dispersing agent and the liquid dispersing medium, such as water. If a particularly stable liquid dispersion is desired, the dispersion may be passed through a colloid mill or homogenizer, or other device which subjects the mixture to high shear.

To prepare directly a dispersion comprising the silica in a solid matrix of organic polymer, a number of methods are available. The polymer may be melted, the silica sol added, and the water of the sol driven off by further heating. Similarly, the polymer may be subjected to intensive working, as on a rubber mill, a sigma-arm mixer, or an ink mill, and the silica sol may be added to the mill during the working operation. Heat may be supplied to aid evaporation of the water added with the sol. Alternatively, the silica sol may be added to a monomer and the monomer may then be polymerized. The method of mixing will in any event be selected with a view to the character of the final product desired and to the nature of the polymer being modified.

CHARACTERISTICS OF PRODUCTS

The products of this invention are characterized by being solid dispersions containing an alkali-stabilized colloidal silica and a water-insoluble organic polymer having a molecular weight of more than 10,000. The silica is in the form of substantially discrete and spherical particles which are dense and have an ultimate particle size of .01 to .03 microns. The polymer is a plastic and may be elastomeric.

The proportions of silica and polymer in the products may be widely varied. Two per cent by weight of silica in the polymer-silica mixture provides an appreciable modification of the properties of the polymer, but amounts up to equal parts of silica and polymer may sometimes be used to advantage. The proportion of silica employed is ordinarily larger when the dispersion is a joint dispersion of the polymer and silica sol in a liquid medium.

USES OF THE NOVEL COMPOSITIONS

Compositions of this invention are useful for a variety of purposes. For instance, the solidified films made by drying dispersions containing latex and alkali-stabilized colloidal silica are useful as adhesives. The adhesives preferably contain organic amines as stabilizers as set forth in U. S. application Serial No. 128,255, filed November 18, 1949, by Horning and Shay, now U. S. Patent 2,601,291. In foamed polychloroprene, inclusion of alkali-stabilized colloidal silica permits replacement of polymer without loss of modulus and with no other undesirable change of properties. Dispersions of alkyd resins and of nitrocellulose in combination with alkali-stabilized colloidal silica can be dried to form solid products which are improved coating compositions. Phenolic resins containing alkali-stabilized silica in aqueous dispersion can be dried to solid films which act as binding agents. Water paints of the aqueous emulsion type, in which heat-bodied oils and oil-modified alkyd resins are dispersed with water along with pigment, can be dried to films which show improved adhesion and durability when alkali-stabilized colloidal silica is added. Similarly, nitrocellulose emulsion coatings adhere better to smooth, hydrophilic surfaces when a minor proportion of sodium hydroxide-stabilized colloidal silica is present. Polyvinyl acetate emulsions containing the type of colloidal silica involved in this invention dry to harder, more water resistant films because of the insolubilizing and hardening action of the colloidal silica. Further uses will become apparent from the examples.

EXAMPLES

The invention will be better understood by reference to the following illustrative examples.

Example I

To 100 parts of a polyvinyl acetate dispersion containing about 50% by weight of solids there was added 22 parts of a 30% solution of sodium hydroxide-stabilized colloidal silica. After thorough mixing, the emulsion was applied by a knife-type coater to a heavy cardboard in such thickness as to result, after drying, in a film of polyvinyl acetate about 0.003" in thickness. The dried film was found to remain firm and to resist blushing when wetted with water, in comparison with a control film containing no silica, which readily softened and became tacky after soaking in water for 2 minutes. Also it was found that the coating containing silica was much more receptive to printing ink than the control.

Example II

Colloidal silica of less than 0.03 micron particle size, when incorporated into latex as an alkali-stabilized colloidal solution, definitely improves the adhesion of synthetic rubber to cellulose fabrics such as rayon and to nylon fabric. For example, a latex formulation was made up as follows:

| | Parts by weight |
|---|---|
| GR–S (styrene/butadiene copolymer) #3 latex (60% solids) | 100 |
| Zinc oxide | 5 |
| Phenyl beta-naphthylamine antioxidant | 2 |
| Sulfur | 2 |
| Mercaptobenzothiazole accelerator | 1 |
| Butyl zimate | 0.5 |
| Carbon black Gastex | 10 |
| Aquarex D surfacing agent | 1.5 |
| Sodium hydroxide | 1.0 |
| Colloidal solution of alkali-stabilized colloidal silica containing 30% by weight of $SiO_2$ | 10 |

An identical latex formulation was also prepared for purposes of comparison containing no silica. Woven rayon fabric was coated with approximately 15% by weight of these latex compositions, dried for three to five minutes at 100° C., and again coated and dried. The coated fabric was then placed in contact with a typical GR–S compounded uncured synthetic rubber formulation and vulcanized under pressure for forty-five minutes, using a pressure of forty-five pounds steam. For testing, one-inch strips were cut out of the assemblies and the adhesion measured by pulling the fabric from the rubber to which it was vulcanized.

On a comparative basis, the fabric which had been pre-coated with the latex formulation containing colloidal silica required a pull of 3.9 pounds in order to pull the fabric from the rubber, while in comparison, the control, containing no silica, required only 2.9 pounds.

Example III

Sodium hydroxide-stabilized colloidal silica may advantageously be mixed with a dispersion of phenol-formaldehyde resin, either in the (a) or the (b) stage of polymerization. For the formulation of adhesives, the (a) stage is preferred. For example, to 50 parts of an 18% solution of sodium hydroxide-stabilized colloidal silica there was added 100 parts of a phenol-formaldehyde resin emulsion containing 14.0% solids. Asbestos paper was impregnated with the resulting mixture and laid up to form a six-ply lamination after the paper had been dried. After curing for 30 minutes at 180° C. and at 1000#/sq. in. pressure, an excellent asbestos board was produced which was stiffer and more resistant to delamination, especially when wet, than a board similarly prepared without the incorporation of silica into the phenolic resin emulsion.

Example IV

To 50 parts of a concentrated water emulsion paint consisting of a dispersion of pigment and binder along with a dispersed heat-bodied drying oil (linseed oil), sufficient water was added to give a paintable consistency. To another 50 parts of the concentrated paint, were added about 100 parts of a 30% solution of sodium hydroxide-stabilized colloidal silica, giving a rather viscous fluid.

The thirty per cent product was made as described in the Bird patent by concentration of effluent. This was done by boiling the effluent slowly in a pot. As thus prepared the sol must be used rather quickly for it is not at all stable towards gelling. The stability is satisfactory after mixing with the emulsion which dilutes the sol.

Equal volumes of each of the concentrated water emulsion paint mixtures above described, were mixed to give an aqueous paint dispersion which was still slightly too thick to apply with a brush, but which became workable when a small amount of additional water was added.

This aqueous paint mixture was brushed on a smooth paper alongside a control containing no silica. After air-drying for about one hour, the paint film containing silica had a much better resistance toward rubbing when wet, than the unmodified paint, and upon flexing the paper the coating showed much better adhesion, especially on areas which had been printed with an oil ink, prior to application of the paint. It was evident that the silica improves the adhesion of the water paint to the surface of the paper especially where the paper is oily or greasy with dirt and also improves the washability of the finish. It is believed that the silica provides an improved bond between the water-insoluble dispersed oil binder and the other constituents of the paint film.

Other drying oils such as poppy and tung oils can be heat-bodied and used instead of the heat-bodied linseed oil of this invention.

*Example V*

100 parts of blown castor oil were emulsified into 100 parts of an 18% solution of sodium hydroxide-stabilized colloidal silica with the aid of 4 parts by weight of carboxy methyl cellulose as the dispersing agent. The resulting emulsion was coated as a thin film on a clean sheet of steel, permitted to dry in the air for 3 hours, and then baked for 1 hour at 130° C. The resulting film was definitely harder than a control similarly prepared without the inclusion of colloidal silica. It was also noted that the film containing the colloidal silica air-dried more rapidly than the control.

*Example VI*

A compostion of this invention containing starch as the dispersed insoluble organic polymer was made up in the following proportions:

| | Parts by weight |
|---|---|
| Starch (50 fluidity pearl) | 16 |
| Clay (kaolinite-type subcretaceous) | 64 |
| Water | 110 |
| Sodium-hydroxide-stabilized colloidal silica solution (18% $SiO_2$) | 10 |

The clay was first mixed with ⅗ of the water and the colloidal silica solution was then added. The clay slip was then added with stirring to a starch suspension made by dispersing the starch in the remaining ⅖ of the water.

This aqueous dispersion was applied as a coating to several different types of paper, including bleached sulfite, rag and kraft, by both brushing it on, and by a doctor blade technique. After drying it was found that the clay was present on the papers as a uniform, adherent coating. This coating was found to be resistant to wet-rubbing, that is, the coating was not easily rubbed off by abrasion when wet; it resisted removal by soaking, being fast after soaking for an hour; it stiffened thin papers; and it took ink marking satisfactorily. A control coating, prepared in identical manner except that no colloidal silica was present, was less water-resistant and did not take ink satisfactorily.

*Example VII*

The remarkable effectiveness of alkali-stabilized colloidal silica as a reinforcing agent in the elastomer, poly-2-chlorobutadiene 1,3 (hereafter referred to as polychloroprene) was demonstrated by making up the following latex formulation:

| | Parts by weight |
|---|---|
| Polychloroprene (5.0% aqueous dispersion using sodium resinate as dispersing agent, commercially known as neoprene Type 571) | 100 |
| Zinc oxide | 5 |
| Phenyl betanaphthylamine antioxidant | 2 |
| Sulfated methyl oleate surfacing agent | 1.5 |
| Naphthenic acid commercially known as Sunaptic acid | 1.0 |
| Sodium-stabilized colloidal silica solution (30% $SiO_2$ by weight) | 66.6 |

The silica was incorporated into the mixture by stirring. Rubber films were prepared by the coagulating dip method, in which a mold was first dipped in a coagulating solution composed of 41.7% calcium chloride, 41.7% calcium nitrate, 8.3% acetone and 8.3% methanol. The dipped molds were permitted to stand in air until the organic solvents had evaporated, leaving a thin film of calcium salts on the surface. They were then dipped into the above compounded latex for 10 minutes, removed slowly and again dipped briefly into the coagulating solution, then washed for four hours with water at 50° C., dried four hours in air at 70° C., and cured in air for 45 minutes at 140° C. The following physical tests on the film are shown in comparison with a control made in exactly the same way, except that no silica was used in the latex formulation:

| Property | Elastomer Containing Silica | Control |
|---|---|---|
| Modulus at 600% elongation lbs./sq. in. | 1,775 | 860 |
| ASTM Permanent Set percent | 8 | 10 |
| Abrasion Test [1] | .002 | .004 |

[1] Inches depth abraded off with a Tabor abraser with a 1,000 gram weight and H-182 abrasive per 1,000 cycles.

Polychloroprene compositions in which a silica of particle size of about 0.05 micron and an extinction coefficient of 0.67 was used as a reinforcing agent, had a modulus at 600% elongation of 1290 lbs./sq. in., and when a commercial carbon black "Micronex" was used the modulus was 1450 lbs./sq. in.

*Example VIII*

Outstanding advantages are achieved according to this invention by incorporating alkali-stabilized colloidal silica solutions into elastomer latices which are to be converted into foam sponge. To illustrate, a foamed sponge polychloroprene was prepared according to the following formulation:

| | Parts by weight |
|---|---|
| Polychloroprene latex containing 60% polymer in aqueous dispersion (commercially known as neoprene latex Type 60) | 100 |
| Petrolatum | 3.0 |
| Sodium dibutyl dithiocarbamate | 1.5 |
| Zinc oxide | 5.0 |
| Phenyl betanaphthylamine antioxidant | 2.0 |
| Sulfur | 2.0 |
| Para-nitrosobenzene accelerator | 2.0 |
| Catechol | 1.0 |
| Glycine | 0.5 |
| Sodium fluosilicate | 1.25 |
| Alkali-stabilized colloidal silica solution containing 30% $SiO_2$ by weight, prepared by ion exchange according to Bird Patent 2,244,325 | 18.7 |

This formulated latex was then whipped into a foam by beating air into it. Samples were vulcanized thirty minutes at the temperature of steam at forty pounds pressure. A control sample was prepared in the same manner except that water was added in place of the solution of colloidal silica, in order to provide a formulation identical with the above except that no silica was present.

The load-carrying capacity of the resulting sponge containing silica, when measured by a compression-deflection method, was 0.91 lbs./sq. in. in comparison with 0.33 lb./sq. in. for the control. This increase in load-carrying capacity can be otherwise obtained only by increasing the polychloroprene content per unit volume by about 50%, or by using twenty parts by weight of a filler such as clay, which, however, gives a sponge product which does not recover as fully after compression as the material containing silica. The reinforcing action of the silica in comparison to the rubber is especially advantageous since the sponge retains its resilience and recovery from compression to a much greater degree than when other fillers are used. The sponge has the additional advantage that in spite of its good load-carrying capacity, it is much lighter in weight than a polychloroprene sponge containing no silica but sufficient polychloroprene to give the required load-carrying capacity. This is especially important in the case of sponge rubber used for cushions in automobiles, airplanes, and trains.

*Example IX*

To demonstrate the effect of colloidal silica in improving the adhesion between polychloroprene and rayon fabric pre-coated with a polychloroprene latex containing colloidal silica, a composition was made up in a manner similar to that of Example II except using polychloroprene latex instead of GR-S latex for pre-coating the fabric. The pre-coated fabric was then vulcanized against a polychloroprene compound having the following composition:

Parts by weight
Commercial polychloroprene (GRM 10) _____ 100
Magnesium oxide _____ 4
(alpha)beta naphthylamine _____ 1
Zinc oxide _____ 5
Sodium acetate _____ 1
Light process oil (Circo) _____ 10
Semi reinforcing carbon black _____ 20
Stearic acid _____ 1
Petrolatum _____ 5

The force required to strip the fabric in this case was 14.8 pounds for the sample containing silica, while it was only 6.8 pounds for the control containing no silica.

*Example X*

This example illustrates the use of colloidal silica in an aqueous dispersion of a styrene-butadiene copolymer and the formation of films therefrom.

A colloidal silica sol containing 30% $SiO_2$, prepared by the process of Bechtold and Snyder and having the properties described above for the especially preferred sols of this process, was diluted with distilled water to a solids content of 12%. Morpholine was added equal to 15% by weight of the silica solids. An aqueous dispersion of "Pliolite" Latex 170 was diluted with distilled water to a solids content of 12%. Morpholine was added equal to 15% by weight of the polymer solids.

A film cast from the aqueous dispersion of the "Pliolite" Latex 170 and allowed to dry at room temperature, was continuous and transparent but had little body and was wrinkled and tacky.

One part of the silica sol was then mixed with four parts of the "Pliolite" dispersion, both being stabilized with morpholine as described, and a film was cast from the homogeneous mixed dispersion, and was dried at room temperature. The film was stiffer than that of the resin without silica, and had no tack. It was similar in appearance to "Vinylite" sheeting.

A third film was cast on glass and dried at room temperature from a mixture of 2 parts of the morpholine stabilized "Pliolite" dispersion and one part of the 12% silica sol not stabilized with morpholine. The film was hard and transparent and was not tacky. It was very adherent to glass and could not be stripped off as a film. Thus the presence of colloidal silica improves the properties of films prepared from the "Pliolite" 170 latex.

*Example XII*

The improvement in polychloroprene adhesives made possible by this invention is illustrated in this example.

An adhesive was made up according to the following formula:

Parts by weight
Polychloroprene latex (neoprene) latex Type 572 containing about 50% solids by wt.) _____ 100
Glycerol ester of hydrogenated rosin, M. P. 83 to 86 _____ 40
Hydrocarbon solvent _____ 10
Zinc oxide _____ 5
Antioxidant _____ 2

A silica sol of the especially preferred Bechtold and Snyder type above-described, containing 30% $SiO_2$ was added to this adhesive. To separate portions of the adhesive were added 5 and 10 parts by weight of silica, based on the solids weight of polychloroprene.

The adhesive strengths, in pounds per inch width, of bonds made with the unmodified and modified adhesives were as follows:

| Parts Silica per Hundred | 0 | 5 | 10 |
|---|---|---|---|
| | Adhesive Strengths | | |
| Leather to Leather | 7.5 | 12.0 | 21.5 |
| Canvas to Canvas | 5.0 | 10.0 | 17.0 |

CHARACTERIZATION TECHNIQUES

*Particle size measurement by the electron microscope*

The size of the silica particles and the fact as to whether or not they are non-agglomerated, that is, substantially discrete, can be directly observed if the silica is spread out in an extremely thin layer and examined with the electron microscope. Since the limit of resolution of the electron microscope is well below the 10 millimicron limit of the particles, there is no difficulty in ascertaining whether particles of the desired size are present. By examining the silhouette of the particles it is possible to measure the particle diameter in those cases where the particles are lying in such a way as to present more than a semicircle of cross section. Where less than a semicircle of cross section of a particle can be observed due to the fact that it is obscured by other particles, the particle is not measured. However, by counting and measuring a large number (several hundred) of particles which are lying in such positions as to present at least a semicircle of silhouette, the arithmetic mean particle diameter, i. e., the number average diameter, $d_n$, the surface area average diameter, $d_s$, and the particle size distribution can be determined. From the surface area average diameter, a specific surface area, $S_e$, can be calculated. This is the specific surface area which the ultimate units would have if they were non-agglomerated, discrete, dense particles, having an entirely exposed smooth surface.

In counting the particles, they are grouped according to diameter, as measured in millimicrons; each group consists of particles lying within a five millimicron range, for example, 10–15 millimicrons, 15–20 millimicrons, 20–25 millimicrons, etc. The surface area of the particles within each group is calculated from the average diameter of the group and the number of particles within the group. The total surface area of all the counted particles may then be calculated by summation of the areas in each group. The specific surface area is this total surface area, divided by the total mass of the particles counted, the latter being determined by summation, using the known density of the silica.

In carrying out this calculation, it is convenient to calculate first a "surface area average diameter," $d_s$, which would be the diameter of a spherical unit having the same specific surface area as that of the total collection of counted units.

This may be expressed mathematically, as follows:

$$d_s = \frac{\sum_{i=1}^{i=k} n_i d_i^3}{\sum_{i=1}^{i=k} n_i d_i^2}$$

where $n_i$ is the number of units in the $i$th range of sizes, the mean diameter of each being $d_i$ (e. g., $d_i = 12.5$ for the range 10–15 millimicrons) and $k$ is the number of size ranges.

The specific surface area, $S_c$, expressed as square meters per gram, may then be calculated from $d_s$, measured in millimicrons, taking the density of silica to be 2.2 grams per cc., which is the density of amorphous anhydrous, non-porous silica, $$S_c = \frac{6 \times 10^3}{\text{density} \times d_s} = \frac{2720}{d_s}$$

The arithmetic mean particle diameter is simply the number average particle diameter, $d_n$, which is determined from the formula $$\frac{\sum_{i=1}^{i=k} n_i d_i}{n}$$

where $n_i$ and $d_i$ are defined as before and $n$ is the total number of particles counted.

In determining the size of silica particles by the electron microscope it is necessary to avoid changes such as agglomeration or coalescence of the particles which may occur in drying the sols. This is minimized by diluting the sol and allowing the water to evaporate at room temperature. The sample may be diluted to a concentration of from about 0.25 to 0.01% $SiO_2$, but in general the maximum dilution will be used which permits retention of a sufficient number of particles in the field to permit counting of the particles as described above.

The particle counts are made from electron micrographs taken at 5,000 diameters magnification enlarged to 25,000 diameters by conventional photographic printing techniques and finally projected on a screen to a total magnification of about 250,000 diameters. Methods of mounting the samples, and counting and measuring the particles are described by J. H. L. Watson in an article entitled "Particle Size Determinations with Electron Microscopes" in Analytical Chemistry, volume 20, pages 576–584 for June 1948. The method of calculating particle size distribution is described in an article by L. R. Sperberg and H. M. Barton in "Rubber Age," volume 63, pages 45–51 for April 1948.

*Surface area determination by nitrogen adsorption*

The density of the silica particles may be determined by comparing their surface areas as calculated from electron micrographs as described above with the surface areas as determined by nitrogen adsorption. The method used for measuring specific surface areas by low temperature nitrogen adsorption is described in "A New Method for Measuring the Surface Areas of Finely Divided Materials and for Determining the Size of Particles" by P. H. Emmett in Symposium on New Methods for Particle Size Determination in the Sub-Sieve Range, p. 95, published by The American Society for Testing Materials, March 4, 1941. The value of 16.22 for the area covered by one surface adsorbed nitrogen molecule was used in calculating the specific surface areas.

When evaporating the sols to dryness for nitrogen adsorption determinations on the particles therein, the sols should be adjusted to a pH of about 3 to 4, and dried at room temperature and then at 110° C. If the sol is evaporated in the basic pH range, the specific surface area as determined by nitrogen adsorption will be significantly less than if the sol is evaporated in the acidic pH range of 3–4. This decrease in specific surface area upon evaporation in the basic region appears to be due to a coalescence of the silica particles.

If the specific surface area as determined by nitrogen adsorption is not substantially greater, for example, not more than 25% greater, than the specific surface area as calculated from electron micrographs the particles are dense and the sol is suitable for use in the process of this invention. If the silica particles are porous they will be penetrated by nitrogen and the nitrogen adsorption will be relatively high, and consequently the specific surface area by nitrogen adsorption will also be high—much higher than would be expected on the basis of the direct observation of the particles by means of the electron microscope. On the other hand, if the specific surface area by nitrogen adsorption is not substantially greater than that calculated from electron micrographs, the particles are substantially smooth, discrete, non-porous spheres. This confirms direct observations as made with the electron microscope.

*Measurement of relative viscosity*

Relative viscosity refers to the ratio of the viscosity of a solution or sol to the viscosity of the solvent. The viscosity is measured at 25° C. on a sol having a pH of 10 and containing 10% $SiO_2$ by weight. A sol which is electrolyte-free must be adjusted to pH 10 for the purpose of this measurement by the adition of sodium hydroxide. A sol containing less than 10% $SiO_2$ may be concentrated up to 10% $SiO_2$ by vacuum evaporation of water at room temperature and a more concentrated sol may be diluted back with water to 10% for measurement.

The viscosity measurements used in determining relative viscosity may be made according to conventional methods provided they are capable of adequate precision. Measurements made with a modified Ostwald capillary pipette for instance, under properly controlled conditions of temperature are adequate for the purpose.

The relative viscosity of the preferred sols used in this invention should be 1.15–1.55 measured at 10% $SiO_2$ and a pH of 10.0. The lower limit corresponds to the relative viscosity of a sol comprising as the dispersed phase only dense, discrete, spherical silica particles. This limit may also be supported by theoretically derived calculations. Sols having a relative viscosity greater than 1.55, on the other hand, may contain significant amounts of low molecular weight silica, particles of silica gel, or non-spheroidal particles, all of which interfere with the concentration of the sols to high silica contents.

*Measurement of specific conductance*

The specific conductance of the silica sols used in this invention may be determined in accordance with conventional practices, such as those described by Glasstone, Textbook of Physical Chemistry, at page 874 et seq. The specific conductance is measured at 28° C. on a sol containing 10% by weight of silica expressed as $SiO_2$.

*Measurement of molecular weight by light scattering*

The use of light scattering for the measurement of the absolute turbidity of silica sols (expressed as cm.$^{-1}$) and the weight average molecular weight of the silica particles in sols disclosed herein is described by Michael Sveda in "Soap and Sanitary Chemicals" July and August 1949, at page 121 et seq. Excellent results have been obtained, for example, using a B-S light scattering photometer manufactured by the Phoenix Precision Instrument Co., an improved form of the apparatus originally described by R. Speiser and B. A. Brice in Journal of the Optical Society of America, volume 36, p. 364, 1946. A light scattering photometer such as that described by P. P. Debye, Journal of Applied Physics, volume 17, May 1946, may also be used. The method of measurement is adapted from the method described by Stein and Doty, Journal of the American Chemical Society, volume 68, p. 159, 1946.

Measurement of turbidity

Colloidal suspensions are more or less cloudy to visible light, depending upon the wavelengths, the finer the particles the clearer the solution. Other factors, such as the pH, salt content in the system, or the relative refractive indices of the particles with respect to the solvent or dispersion medium, of course, also play a role in determining the degree of turbidity, but, in general, the appearance of the solution gives some indication of the relative size of the dispersed particles in a given system, other factors being relatively fixed.

By comparing solutions of colloidal silica at the same concentration of SiO₂, the relative transparency to light is an indication of the type of particles present. However, by working with monochromatic light and by measuring the percentage of light transmitted through a solution of a given depth at a given concentration of silica, there can be calculated a constant, known as the "extinction coefficient."

By a combination of Beer's and Lambert's law, the following formula can be derived:

$$E_{1cm.}^{1\%} = \frac{1}{pL} \log_{10} \frac{(I_0)}{I}$$

where $E_{1cm.}^{1\%}$ = extinction coefficient $p$ = per cent by weight of SiO₂ in the colloidal solution.
$L$ = length of adsorption cell in centimeters.
$I_0$ = 100, corresponding to the intensity of light of the specified wavelength transmitted by the pure dispersion medium which in this case is water.
$I$ = observed intensity of light of the given wavelength transmitted by the sol as compared to the transmission of pure water.

It will be noted that the "extinction coefficient" for a given type of solution is a constant which is independent of the concentration of the solution and of the length of the cell through which the light passes, but the numerical value depends upon the manner in which the concentration of the solution is expressed and upon the units in which the length of the cell is measured. In this case, the extinction coefficient is given in terms of the percentage by weight of silica in solution and in terms of centimeters of cell length. The measurements are made using light in the near ultraviolet range having a wavelength of 400 millimicrons. A Beckman quartz spectrophotometer Model DU is used in making the measurements. The preferred sols which have been found to be particularly useful in this invention have an extinction coefficient of less than 0.25. The measurements are made at 25° C. on a sol diluted to 1% SiO₂ and at a pH of 9–10.

Chemical analysis

Standard analytical techniques are used throughout with the following limitation.

*Determination of titratable alkalinity.*—In order to determine the SiO₂:M₂O ratio, it is necessary to analyze the solution for silica and titratable alkalinity. The latter is determined by titrating the sol with HCl to a pH of 4.5 using a glass electrode pH meter.

This application is a division of my copending United States application Serial No. 239,853 filed August 1, 1951, as a continuation-in-part of my then co-pending United States application Serial No. 699,086 filed September 24, 1946, now abandoned, and of my then co-pending United States application Serial No. 172,021 filed July 3, 1950, now Patent 2,597,872, the latter being a continuation-in-part of my United States application Serial No. 699,087 filed September 24, 1946, now abandoned.

I claim:

1. A composition comprising a solid matrix of a water-insoluble organic elastomer foam having a molecular weight greater than 10,000, selected from the group consisting of natural rubber, polychloroprene, chlorinated rubber, and copolymers of conjugated dienes in which there has been dispersed an alkali-stabilized colloidal silica having an average ultimate particle size of about 0.01 to 0.03 micron, the alkali being substantially all outside of the silica particles.

2. A composition comprising a solid matrix of a water-insoluble organic conjugated diene elastomer foam having a molecular weight greater than 10,000 in which there has been dispersed an alkali-stabilized colloidal silica having an average ultimate particle size of about 0.01 to 0.03 micron, the alkali being substantially all outside of the silica particles.

3. A composition comprising a solid matrix of a water-insoluble organic elastomer foam having a molecular weight greater than 10,000, selected from the group consisting of natural rubber, polychloroprene, chlorinated rubber, and copolymers of conjugated dienes, in which there has been dispersed an alkali-stabilized colloidal silica having an average ultimate particle size of 0.015 to 0.03 micron and an SiO₂:alkali oxide mole ratio of from 10:1 to 500:1 and consisting of dense, amorphous, non-agglomerated particles, the alkali being substantially all outside of the silica particles.

4. A composition comprising a solid matrix of a water-insoluble organic elastomer foam having a molecular weight greater than 10,000, selected from the group consisting of natural rubber, polychloroprene, chlorinated rubber, and copolymers of conjugated dienes, in which there has been dispersed an alkali-stabilized colloidal silica having an average ultimate particle size of 0.001 to 0.100 micron and an SiO₂:alkali oxide mole ratio of from 10:1 to 500:1 and consisting of dense, amorphous, hydrated silica particles, the alkali being substantially all outside of the silica particles.

References Cited in the file of this patent

UNITED STATES PATENTS 2,597,872   Iler _____ May 27, 1952